(12) United States Patent
Trieste, Jr.

(10) Patent No.: US 10,253,915 B2
(45) Date of Patent: Apr. 9, 2019

(54) ELECTROFUSION FITTING AND METHOD OF REPAIRING PIPES

(71) Applicant: Consolidated Edison Company of New York, Inc., New York, NY (US)

(72) Inventor: Richard J. Trieste, Jr., Staten Island, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 91 days.

(21) Appl. No.: 15/333,934

(22) Filed: Oct. 25, 2016

(65) Prior Publication Data

US 2017/0122485 A1  May 4, 2017

Related U.S. Application Data

(60) Provisional application No. 62/248,507, filed on Oct. 30, 2015.

(51) Int. Cl.
*F16L 55/16* (2006.01)
*F16L 55/18* (2006.01)
(Continued)

(52) U.S. Cl.
CPC ............ *F16L 55/18* (2013.01); *B29C 65/342* (2013.01); *B29C 66/1122* (2013.01); *B29C 66/1312* (2013.01); *B29C 66/532* (2013.01); *B29C 66/547* (2013.01); *B29C 66/73921* (2013.01); *B29C 65/3468* (2013.01); *B29C 66/8223* (2013.01); *B29C 73/04* (2013.01);
(Continued)

(58) Field of Classification Search
CPC .................. B29C 65/3468; F16L 55/1683
USPC .......................................... 138/99, 97
See application file for complete search history.

(56) References Cited

U.S. PATENT DOCUMENTS 3,954,288 A * 5/1976 Smith ...................... F16L 1/26
                                                          285/93
4,111,234 A * 9/1978 Wells .................... F16L 55/172
                                                         138/167

(Continued)

OTHER PUBLICATIONS

"PE Pipe Joining Procedures" Plastic Pipe Institute, Chapter 9, pp. 327-357, Retrieved from the Internet: URL://https://plasticpipe.org/pdf/chapter09.pdf [retrieved on Jun. 7, 2018].

(Continued)

*Primary Examiner* — James Hook
(74) *Attorney, Agent, or Firm* — Cantor Colburn LLP

(57) ABSTRACT

A fitting for repairing a leaking polymer pipe is provided. The fitting includes a first housing and a second housing that are sized to fit about the pipe. The first housing includes a first coil configured to increase in temperature in response to the application of an electrical current to fuse the first housing to the second housing and the pipe. The second housing includes a second coil on a first end and a third coil on an opposing end. The second and third coils configured to increase in temperature in response to the application of electrical current to fuse the second housing to the pipe. The fitting further includes a first seal coupled to the first housing and a second seal coupled to the second housing. The first and second seal forming a seal that prevents gas pressure from the pipe from interrupting the fusion process.

16 Claims, 4 Drawing Sheets

(51) Int. Cl.
B29C 65/34 (2006.01)
B29C 65/00 (2006.01)
B29K 105/00 (2006.01)
B29L 23/00 (2006.01)
B29C 73/04 (2006.01)

(52) U.S. Cl.
CPC .............. B29K 2105/258 (2013.01); B29K 2995/0005 (2013.01); B29L 2023/22 (2013.01)

(56) References Cited

U.S. PATENT DOCUMENTS

| | | | | |
|---|---|---|---|---|
| 4,790,058 A * | 12/1988 | Miller | ............... | F16L 21/06 138/99 |
| 4,927,184 A * | 5/1990 | Bourjot | ............... | B29C 65/34 138/141 |
| 5,853,030 A * | 12/1998 | Walding | ............... | F16L 41/12 138/99 |
| 5,926,936 A * | 7/1999 | Ikeda | ............... | B29C 66/5221 156/304.2 |
| 6,211,492 B1 * | 4/2001 | Tanaka | ............... | B29C 65/342 156/273.9 |
| 6,237,640 B1 * | 5/2001 | Vanderlee | ............... | B29C 65/342 138/162 |
| 6,331,698 B1 * | 12/2001 | Hintzen | ............... | B29C 65/342 156/304.2 |
| 6,394,502 B1 * | 5/2002 | Andersson | ............... | B29C 66/1122 285/21.2 |
| 6,870,143 B2 * | 3/2005 | Martinez | ............... | F16L 55/17 138/171 |
| 6,883,835 B2 * | 4/2005 | Krout | ............... | F16L 55/1683 138/97 |
| 6,901,967 B1 * | 6/2005 | Kuenzer | ............... | F16L 55/172 138/156 |
| 7,338,085 B2 * | 3/2008 | Toriyabe | ............... | B29C 65/344 156/273.9 |
| 8,113,242 B1 * | 2/2012 | Bennett | ............... | B29C 66/81821 138/97 |
| 8,210,210 B2 * | 7/2012 | Clark | ............... | F16L 55/168 138/97 |
| 2015/0183155 A1 * | 7/2015 | Saito | ............... | B29C 65/1677 210/483 |

OTHER PUBLICATIONS

§192.281 Plastic pipe. Title 49: Transportation, Part 192—Transportation of Natural and Other Gas By Pipeline: Minimum Fed. Safety Standards, Subpart F—Joining of Materials Other Than by Welding(pp. 1) http://www.phmsa.dot.gov/regulations, e-CFR Jun. 5, 2018.

* cited by examiner

ELECTROFUSION FITTING AND METHOD OF REPAIRING PIPES

CROSS-REFERENCE TO RELATED APPLICATIONS

The present application is a Nonprovisional Application of U.S. Provisional Application Ser. No. 62/248,507 filed on Oct. 30, 2015, the contents of which are incorporated herein by reference.

BACKGROUND OF THE DISCLOSURE

The subject matter disclosed herein relates to a fitting for use with plastic pipes, and in particular to a fitting that may be used to repair a leaking pipe.

Plastic or polymer piping systems are used in a variety of applications, such as the delivery of natural gas to end customers. Due to a variety of factors, a hole in the pipe pressure boundary may occur creating a leak. To ensure continuous and reliable delivery of the natural gas, it is desirable to repair the leak once it is discovered. A temporary repair may be performed using a sealant and some type of clamp. For example, the repair may involve applying a sealant or epoxy material, covering the sealant and the pipe with an elastomer sheet and then clamping the sheet to the pipe with a band clamp or installing a tapered element referred to as sticking or pinning to minimize the leakage of natural gas.

While the temporary repair stops the leak, a more permanent repair is desired. Typically this involves shutting off the flow of gas to the effected pipe and venting the gas from the pipe downstream from the valve. Once the gas is vented, the pipe is spliced and a new section of pipe is installed. It should be appreciated that this permanent repair process may take some time to perform and is disruptive to the end customers since they temporarily lose their access to natural gas.

Accordingly, while existing gas line repair systems are suitable for their intended purposes the need for improvement remains, particularly in providing a system for repairing a leaking pipe without disconnecting the pipe from the gas source.

BRIEF DESCRIPTION OF THE DISCLOSURE

According to one aspect of the disclosure, a fitting for repairing a leaking polymer pipe is provided. The fitting includes a first housing having a first end and an opposing second end with a first body therebetween, the first body having a first interior surface defining a semicircular-shaped first channel, the first channel sized to receive a first portion of a pipe. A second housing is provided having a first end and an opposing second end with a second body therebetween, the second body having a second interior surface defining a semicircular shaped second channel, the second channel sized to a second portion of a pipe. A first coil is configured to conduct electrical current disposed within first housing, the first coil having a first portion adjacent the first end, a second portion adjacent the second end, a third portion extending between the first portion and the second portion. A second coil is configured to conduct electrical current disposed within the second housing adjacent the second housing first end. A third coil is configured to conduct electrical current disposed within the second housing adjacent the second housing second end. A first seal is coupled to the first interior surface, the first seal positioned to contact the pipe adjacent the first housing first end and second end, the first seal further having a portion contacting the second housing when the first housing and second housing are coupled. A second seal is coupled to the second housing, the second seal positioned to contact the pipe adjacent the second housing first end and second end, the second seal further having a portion contacting the first housing when the first housing and second housing are coupled.

According to another aspect of the disclosure, a method of electrofusing a polymer pipe having a leak is provided. The method includes providing a first housing having a first coil and a first seal disposed about the periphery of the first coil. A second housing is provided having a second coil adjacent a first end, a third coil adjacent an opposing second end and a second seal, the second coil being disposed between first end and the second seal, the third coil being disposed between the second end and the second seal. The first housing is placed onto the pipe about a location having a leak. The second housing is placed onto the pipe. The first housing is coupled to the second housing. The first housing is sealed to the pipe and to the second housing when the first housing is coupled to the second housing. The second housing is sealed to the pipe when the first housing is coupled to the second housing. The first housing is fused to the second housing and the pipe by applying electric current to the first coil. The second housing is fused to the pipe by applying electric current to the second coil and third coil.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present invention provide a gas pipe fitting that provides advantages in allowing a leaking plastic gas pipe to be repaired. Embodiments of the invention provide advantages in allowing the fitting to be installed over a temporary repair that in some instances may have some degree of leakage. Still further embodiments of the invention provide advantages in sealing the fitting to the pipe and venting of the fitting while the fitting is fused to the pipe.

Figure 1:
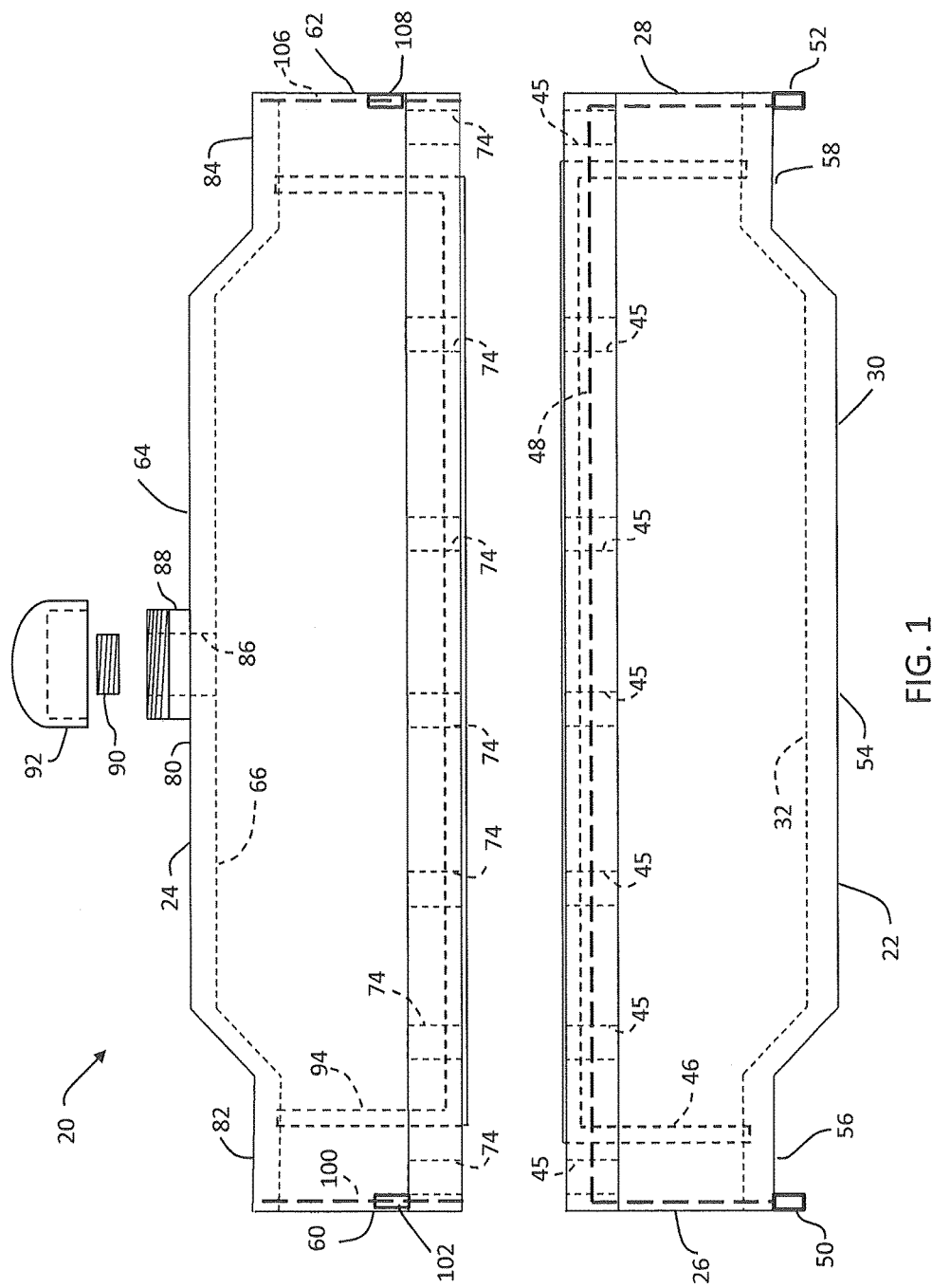
FIG. 1 is a partially disassembled side view of a fitting for repairing a leaking gas pipe in accordance with an embodiment of the invention.
Figure 2:
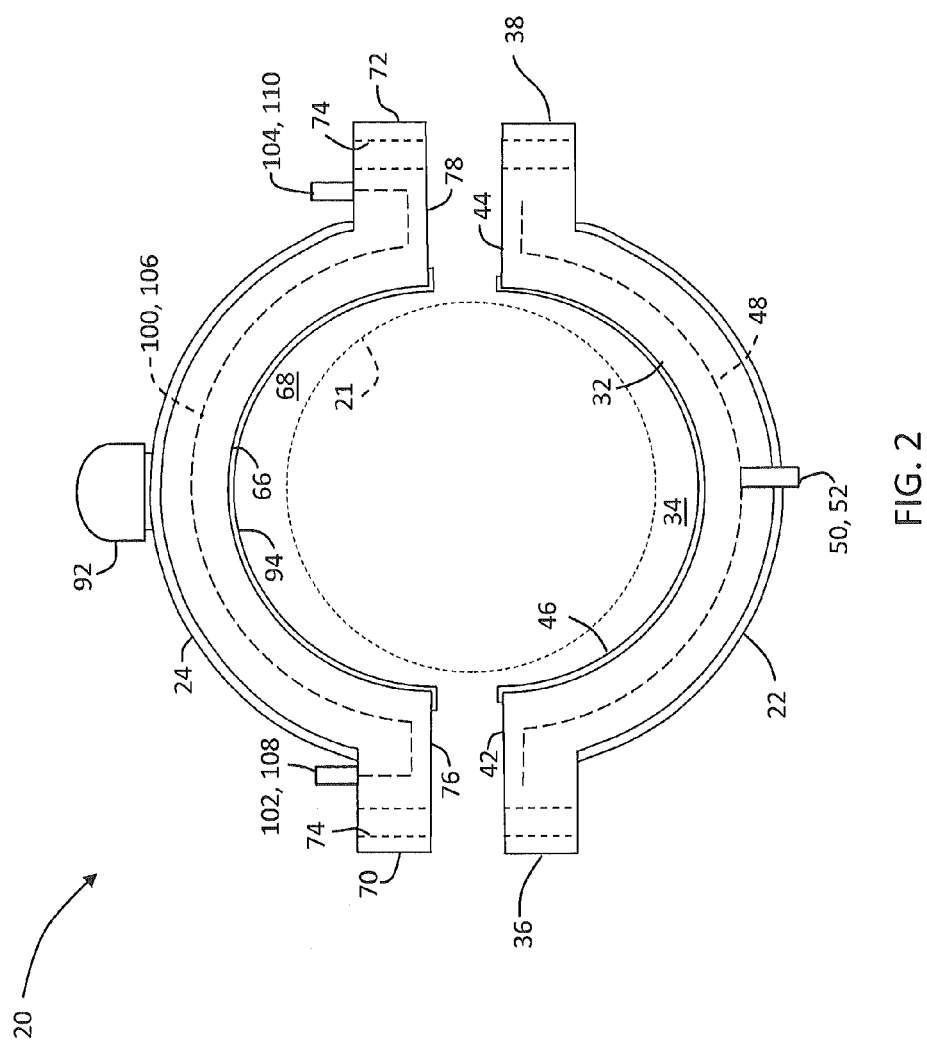
FIG. 2 is an end view of the fitting of FIG. 1.
Figure 3:
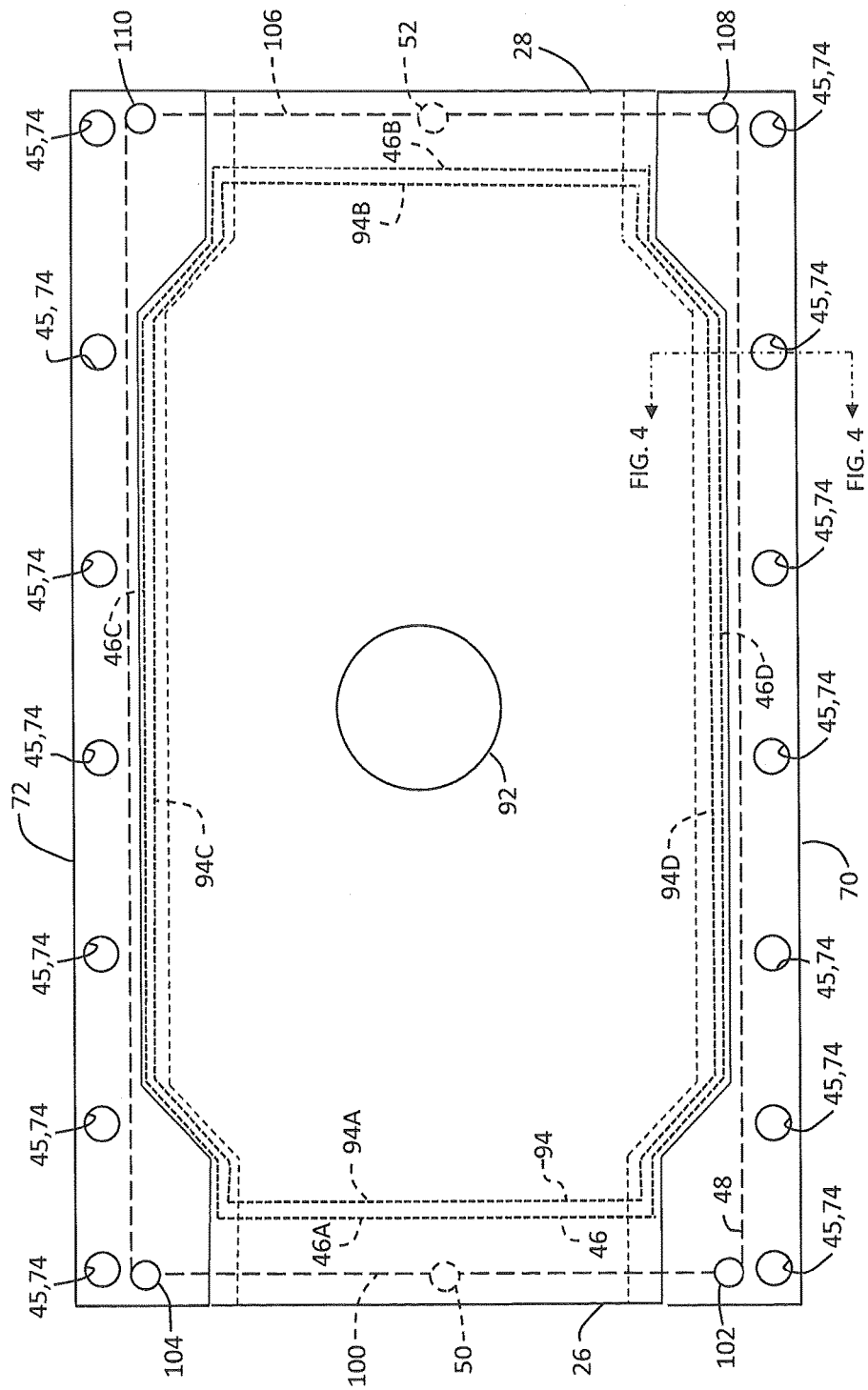
FIG. 3 is a plan view of the fitting of FIG. 1.

Referring to FIGS. 1-3, an embodiment of a fitting 20 is shown for repairing a leaking polymer or plastic pipe, such as a natural gas pipe 21. The fitting 20 includes a first housing 22 and a second housing 24. The housings 22, 24 cooperate to encapsulate or surround the portion of the pipe 21 where leak is located. The housings 22, 24 are formed from a suitable plastic material, such as polyethylene for example, that is capable of being joined by an electrofusion process. The first housing 22 includes a first end 26, an opposing second end 28, and a body portion 30 therebetween. The body portion 30 is shaped to define a generally semicircular inner surface 32 that extends between the first end 26 and the second end 28. The inner surface 32 defines a channel 34 that is sized and shaped to receive the pipe 21 being repaired.

Figure 4:
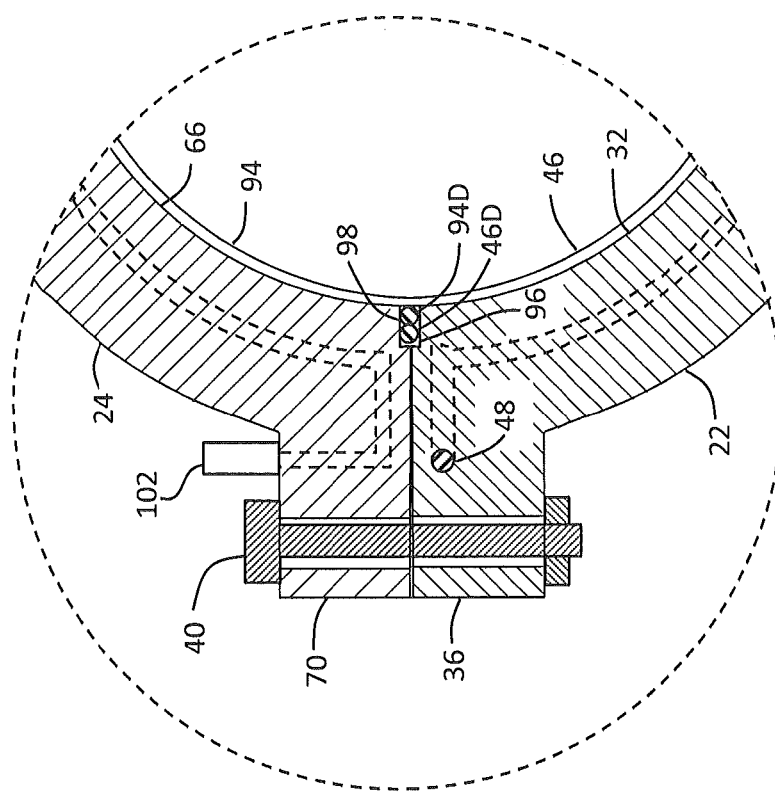
FIG. 4 is a partial sectional view of the fitting of FIG. 1.

The first housing 22 further includes a pair of opposing flanges 36, 38, The flanges 36, 38 extend generally perpendicular to the longitudinal axis of the first housing 22 from the side of the first housing 22 adjacent to the open side of channel 34. The flanges 36, 38 each have a plurality of openings 45 sized to receive a fastener 40 (FIG. 4). As will be discussed in more detail herein, the fasteners 40 clamp the first housing 22 to the second housing 24 during an electrofusion process. The flanges 36, 38 further define a planar mating surface 42, 44 that engages the second housing 24 when the housings 22, 24 are clamped together. It should be appreciated that in other embodiments, the surfaces 42, 44 may include other features, such as ridges, protrusions, slots or recesses for example, that allow the an interlocking of the housings 22, 24, such as with a bridle joint or a lap joint for example.

In one embodiment, the body portion 30 includes a center portion 54 that has a larger diameter than the end portions 56, 58. In some embodiments, the larger diameter of the center portion 54 allows the fitting 20 to be installed over another fitting (such a fitting or coupling having a leakage), or over a temporary repair. In the case of the temporary repair, this enlarged center portion 50 allows the permanent repair to be performed without removing the earlier temporary repair.

A first seal 46 is coupled to the first housing 22. In one embodiment, the first seal 46 may be an o-ring type seal. The first seal 46 extends substantially about the periphery of the channel 34. In one embodiment, the first seal includes a first portion 46A arranged adjacent to and offset from the first end 26 and a second portion 46B arranged adjacent to and offset from the second end 28. The first and second portions 46A, 46B have a semicircular profile to match the inner surface 32. The first seal 46 further includes a third portion 46C and a fourth portion 46D that extend between the first portion 46A and the second portion 46B. The third portion 46C and the fourth portion 46D are substantially arranged to extend along the surfaces 42, 44. As will be discussed in more detail herein, the first seal 46 cooperates with the second housing 24 and the pipe 21 to form a seal that isolates the leak from the area where an electrofusion processing is being performed.

The first housing 22 further includes a conductor or electrofusion coils 48. It should be appreciated that while the illustrated embodiment shows the conductor or electrofusion coils as a single or unitary member, the conductor or electrofusion coils may include a plurality of coils or conductors that are arranged adjacent each other to create a sufficiently wide heat path to fuse the respective members as is known in the art. The conductor 48 extends about the periphery of the first housing 22 adjacent to the inner surface 32 (in the areas around the ends 26, 28) and the surfaces 42, 44 (along the flanges 36, 38). The conductor 48 is embedded within the first housing 22 and includes a pair of electrodes 50, 52 that extend through the surface of the first housing 22. As will be discussed in more detail herein, the conductor 48 is arranged to melt the adjacent plastic material of the first housing 22, second housing 24 and the pipe 21 being repaired to allow the materials to fuse together and form a permanent seal that prevent leakage from the pipe 21 to the surrounding environment.

The second housing 24 is shaped similar to the first housing 22. The second housing includes a first end 60, a second end 62 and a body portion 64 therebetween. The body portion 64 is shaped to define a generally semicircular inner surface 66 that extends between the first end 60 and the second end 62. The inner surface 66 defines a channel 68 that is sized and shaped to receive the pipe 21 being repaired.

The second housing 24 further includes a pair of opposing flanges 70, 72. The flanges 70, 72 extend generally perpendicular to the longitudinal axis of the second housing 24 from the side of the second housing 24 adjacent to the open side of channel 68. The flanges 70, 72 each have a plurality of openings 74 sized to receive the fastener 40 (FIG. 4). The flanges 70, 72 further define a planar mating surface 76, 78 that engage the surfaces 42, 44 when the housings 22, 24 are clamped together.

In one embodiment, as with the first housing 22, the second housing the body portion 64 may include a center portion 80 that has a larger diameter than the end portions 82, 84. The larger diameter of the center portion 80 allows the fitting 20 to be installed over another fitting (such a fitting or coupling with a leakage), or over a temporary repair. In the exemplary embodiment, the center portion 80 further includes an opening 86 that extends through a projection 88. The opening 86 includes an internal thread to receive a plug member 90, such as a service tee manufactured by Mueller Company of Chattanooga, Tenn. The projection 88 also includes an external thread that is adapted to receive a cap member 92. As will be discussed in more detail herein, the during the repair process, the opening 86 may be coupled to a vent line, sometimes referred to as a stand pipe, to ventilate any gas leaking from the pipe 21 and avoid pressurizing the channels 34, 68 and placing a pressure on the seals 46,94. Once the repair is completed, the plug 90 is installed in the opening 86 and a cap 92 is coupled to the projection 88.

A second seal 94 is coupled to the second housing 24. In one embodiment, the second seal 94 may be an o-ring type seal. The second seal 94 extends substantially about the periphery of the channel 68. In one embodiment, the second seal 94 includes a first portion 94A arranged adjacent to and offset from the first end 60 and a second portion 94B arranged adjacent to and offset from the second end 62. The first and second portions 94A, 94B have a semicircular profile to match the inner surface 66. The second seal 94 further includes a third portion 94C and a fourth portion 94D that extend between the first portion 94A and the second portion 94B. The third portion 94C and the fourth portion 94D are substantially arranged to extend along the surfaces 76, 78. As will be discussed in more detail herein, the second seal 94 cooperates with the first housing 22 and the pipe 21 being repaired to form a seal that isolates the leak from the area where an electrofusion processing is being performed.

In the exemplary embodiment, the second seal 94 is offset relative to the first seal 46 such that the third portions 46C, 94C are adjacent one another or directly side-by-side when the first housing 22 and second housing 24 are coupled together. Further, the fourth portions 46D, 94D are also adjacent one another or directly side-by-side when the first housing 22 and second housing 24 are coupled together. Referring now to FIG. 4, an embodiment is shown wherein the first housing 22 and second housing 24 each include a groove or slot 96, 98 arranged in the surfaces 42, 44, 76, 78 and directly opposite each other when the first housing 22 and second housing 24 are coupled together. The seal portions 46C, 46D are arranged in the slot 96, while the seal portions 96C, 96D are arranged in the slot 98. The slots 96, 98 are sized to allow the respective seal portions 46C, 96C and portions 46D, 96D to be positioned in the opposing slots 96, 98 when the first housing 22 and second housing 24 are coupled together. This provides advantages in allowing the surfaces 42, 76 and surfaces 44, 78 to mate or directly contact each other and still form a seal when the housings 22, 24 are coupled together. In one embodiment, the second seal end portions 96A, 96B are also offset from the first seal end portions 46A, 46B relative to the ends 26, 60 and ends 28, 62 respectively. In other words, the second seal end portions 94A, 96B are farther from the ends 60, 62 than the first seal end portions 46A, 46B are from the ends 26, 28.

The second housing 24 further includes a first end conductor or first end electrofusion coil 100. The first end conductor 100 extends about the periphery of the first end portion 60 adjacent the inner surface 66. In the exemplary embodiment, the first end conductor 100 is arranged between the second seal portion 94A and the end 60 and on the outside of the area of seal 46 and end 26. The first end conductor 100 is embedded within the second housing 24 and includes a pair of electrodes 102, 104 that extend through the surface of the second housing 24. As will be discussed in more detail herein, the conductor 100 is arranged to melt the adjacent plastic material of the second housing 24 and the pipe 21 to allow the materials to fuse together and form a permanent seal in the end portion 82 to prevent leakage from the pipe 21 to the surrounding environment.

The second housing 24 further includes a second end conductor or second electrofusion coil 106. The second end conductor 106 extends about the periphery of the second end portion 84 adjacent the inner surface 66. In the exemplary embodiment, the second end conductor 106 is arranged between the second seal 94B and the end 62 and on the outside of the area of seal 46 and end 28. The second end conductor 106 is embedded within the second housing 24 and includes a pair of electrodes 108, 110 that extend through the surface of the second housing 24. As will be discussed in more detail herein, the conductor 106 is arranged to melt the adjacent plastic material of the second housing 24 and the pipe 21 to allow the materials to fuse together and form a permanent seal in the end portion 84 that prevents leakage from the pipe 21 to the surrounding environment.

During operation when a leak is detected, service personnel are dispatched to identify the source of the leak. When the leakage is due to a hole in the pressure boundary of the pipe 21, the fitting 20 may be used to make a permanent repair the pipe 21 and prevent further leakage. In one embodiment, the service personnel may perform a temporary repair, such as using a patch member held on by band clamp for example. Pipe 21 is then cleaned in areas of ends 26, 60, 28 62 for the electrofusion process. The first housing 22 and second housing 24 are then positioned over the pipe 21 and clamped together using fasteners 40. It should be appreciated that the center portions 54, 80 are sized to allow the housings 22, 24 to be fitted over the temporary repair device. When the housings 22, 24 are clamped together, the first seal 46 and second seal 94 cooperate to seal the pipe 21 to the fitting 20. Since the plug 90 is not installed, any remaining gas leaking from the pipe 21 will exit via the opening 86. It should be appreciated that this provides advantages in reducing pressure on the seals 46, 94. Thus the seal formed by the seals 46, 94 prevent gas pressure from the pipe 21 from interrupting or creating gaps in the electrofusion process and allows for a contiguous and monolithic weld to be formed. In one embodiment, a vent or stand pipe is attached to the projection 88 to disperse the gas away from the fitting 20 while the remainder of the process is performed.

With the housings 22, 24 clamped together, the service personnel attach an energy source, suitable to perform the electrofusion process, to the electrodes 50, 52, 102, 104, 108, 110. In the exemplary embodiment, each of the electrode pairs (electrodes 50, 52, electrodes 102, 104 and electrodes 108, 110) are separately energized during the fusion process. In one embodiment, the electrode pairs are energized in sequence (i.e. one after the other). In another embodiment, the electrode pairs are energized at the same time. The energy source applies an electric current to the conductors 48, 100, 106. It should be appreciated that the conductors 48, 100, 106 increase in temperature due to the resistance of the conductor to the electrical current. When sufficient current is applied to the conductors 48, 100, 106, the plastic material of the housings 22, 24 and the pipe 21 will melt in the area adjacent the conductors 48, 100, 106. The melted material will intermingle together and when the electric current is removed, the cooling of the material welds the housings 22, 24 and pipe 21 together to form a strong contiguous, monolithic and homogeneous joint. It should be appreciated that the welding 22, 24 and pipe 21 using electrofusion forms a continuous and contiguous seal about the portion of the pipe 21 being repaired.

Once the electrofusion is formed, the stand pipe (if any) is removed. The new pressure seal created by the joining of 22, 24 and pipe 21 is tested with pressure to verify completeness of the seal. Then plug 90 is inserted into the opening 86. The plug 90 seals the interior of the fitting 20 from the environment. The cap 92 is then installed over the plug 90 and the repair of the pipe 21 has been completed.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A fitting for repairing a leaking polymer pipe, the fitting comprising:
    a first housing having a first end and an opposing second end with a first body therebetween, the first body having a first interior surface defining a semicircular-shaped first channel, the first channel sized to receive a first portion of a pipe;
    a second housing having a first end and an opposing second end with a second body therebetween, the second body having a second interior surface defining a semicircular shaped second channel, the second channel sized to a second portion of a pipe;
    a first coil configured to conduct electrical current disposed within first housing, the first coil having a first portion adjacent the first end, a second portion adjacent the second end, a third portion extending between the first portion and the second portion;
    a second coil configured to conduct electrical current disposed within the second housing adjacent the second housing first end;
    a third coil configured to conduct electrical current disposed within the second housing adjacent the second housing second end;
    a first seal coupled to the first interior surface, the first seal positioned to contact the pipe adjacent the first housing first end and second end, the first seal further having a portion contacting the second housing when the first housing and second housing are coupled; and
    a second seal coupled to the second housing, the second seal positioned to contact the pipe adjacent the second housing first end and second end, the second seal further having a portion contacting the first housing when the first housing and second housing are coupled;
    wherein the first coil is disposed about the periphery of the first seal; and
    wherein the first seal is disposed about the periphery of the second seal when the first housing is coupled to the second housing.

2. The fitting of claim 1 wherein the first coil is configured to fuse the first housing to the second housing and the pipe when an electrical current is applied to the first coil.

3. The fitting of claim 2 wherein the second coil and the third coil are configured to fuse the second housing to the pipe when the electrical current is applied to the first coil.

4. The fitting of claim 1 wherein:
    the first housing includes a pair of first flanges extending along opposing sides of the first body; and
    the second housing includes a pair of second flanges extending along opposite sides of the second body.

5. The fitting of claim 4 wherein the third portion is disposed within the pair of first flanges.

6. The fitting of claim 5 wherein:
    the first body includes a first center portion having a first diameter, a first end portion adjacent the first housing first end having a second diameter and a second end portion adjacent the first housing second end having a third diameter, the first diameter being larger than the second diameter and third diameter; and
    the second body includes a second center portion having the first diameter, a third end portion adjacent the second housing first end having the second diameter and a fourth end portion adjacent the second housing second end having the third diameter.

7. The fitting of claim 6 wherein the first housing includes an opening arranged in the second center portion, the opening extending from an external surface through the second interior surface.

8. The fitting of claim 7 wherein the opening includes an internal thread sized to receive a plug member.

9. The fitting of claim 8 wherein the first housing and the second housing are formed from a polymer material.

10. A method of electrofusing a polymer pipe having a leak, the method comprising:
    providing a first housing having a first coil and a first seal disposed about the periphery of the first coil;
    providing a second housing having a second coil adjacent a first end, a third coil adjacent an opposing second end and a second seal, the second coil being disposed between first end and the second seal, the third coil being disposed between the second end and the second seal;
    placing the first housing onto the pipe about a location having a leak;
    placing the second housing onto the pipe;
    coupling the first housing to the second housing;
    sealing the first housing to the pipe and to the second housing when the first housing is coupled to the second housing;
    sealing the second housing to the pipe when the first housing is coupled to the second housing;
    fusing the first housing to the second housing and the pipe by applying electric current to the first coil; and
    fusing the second housing to the pipe by applying electric current to the second coil and third coil.

11. The method of claim 10 wherein the steps of fusing the first housing and the second housing are performed after the steps of sealing the first housing and sealing the second housing.

12. The method of claim 11 wherein the second housing includes an opening through a center portion of the second housing.

13. The method of claim 12 further comprising coupling a stand pipe to the second opening and venting gas leaking from the pipe through the stand pipe.

14. The method of claim 13 wherein the fusing of the first housing to the second housing is arranged between the first seal and an edge of the first housing.

15. The method of claim 14 wherein at least a portion of the first seal and at least a portion of the second seal are positioned alongside each other when the first housing is coupled to the second housing.

16. The method of claim 15 wherein the step of coupling the first housing to the second housing includes coupling a pair of first flanges on the first housing to a pair of flanges on the second housing with a plurality of fasteners.

* * * * *